United States Patent
Andrade et al.

(10) Patent No.: US 12,050,230 B2
(45) Date of Patent: Jul. 30, 2024

(54) AUTOMATIC DEVICE FOR THE AUTOMATED CONDUCT OF ANALYSES, NOTABLY MEDICAL ANALYSES

(71) Applicant: DIAGNOSTICA STAGO, Asnieres-sur-Seine (FR)

(72) Inventors: Serge Andrade, Montrouge (FR); Christophe Villain, Asnieres-sur-Seine (FR)

(73) Assignee: Diagnostica Stago, Asnieres-sur-Seine (FR)

( * ) Notice: Subject to any disclaimer, the term of this patent is extended or adjusted under 35 U.S.C. 154(b) by 0 days.

(21) Appl. No.: 18/050,674

(22) Filed: Oct. 28, 2022

(65) Prior Publication Data
US 2023/0107207 A1 Apr. 6, 2023

Related U.S. Application Data

(62) Division of application No. 15/974,772, filed on May 9, 2018, now abandoned.

(30) Foreign Application Priority Data

May 10, 2017 (FR) ...................................... 1754079

(51) Int. Cl.
*G01N 35/04* (2006.01)
*B01L 3/00* (2006.01)
(Continued)

(52) U.S. Cl.
CPC .......... *G01N 35/04* (2013.01); *B01L 3/50855* (2013.01); *B01L 9/06* (2013.01);
(Continued)

(58) Field of Classification Search
CPC .......... G01N 35/04; G01N 1/14; G01N 35/00; G01N 2035/00326; G01N 2035/00534;
(Continued)

(56) References Cited

U.S. PATENT DOCUMENTS 4,692,308 A * 9/1987 Riley ................... G01N 35/021
422/65
4,927,765 A * 5/1990 Saxon ................ G01N 35/1002
422/561
(Continued)

FOREIGN PATENT DOCUMENTS

EP 1410996 A1 4/2004
EP 2455762 A1 * 5/2012 ....... G01N 35/00732
(Continued)

OTHER PUBLICATIONS

Office Action issued for corresponding Japanese Application No. 2018-090568 dated Feb. 7, 2022, 15 pages (English translation attached).
(Continued)

*Primary Examiner* — Benjamin R Whatley
*Assistant Examiner* — Curtis A Thompson
(74) *Attorney, Agent, or Firm* — Pearne & Gordon LLP

(57) ABSTRACT

Automatic device for the automated conduct of analyses, notably medical analyses, including:
43. a storage zone for bottles,
44. an automated sampling system for selectively sampling the content of a bottle among those present in the storage zone,
45. a loading zone for introducing a new bottle into the automatic device,
46. an unloading zone for collecting a bottle previously present in the storage zone,
47. a bottle conveyor and storage system, configured selectively and individually to transport a bottle from a location in the storage zone to the unloading zone or from the loading zone to a location in the storage zone.

20 Claims, 8 Drawing Sheets

Figure 1:
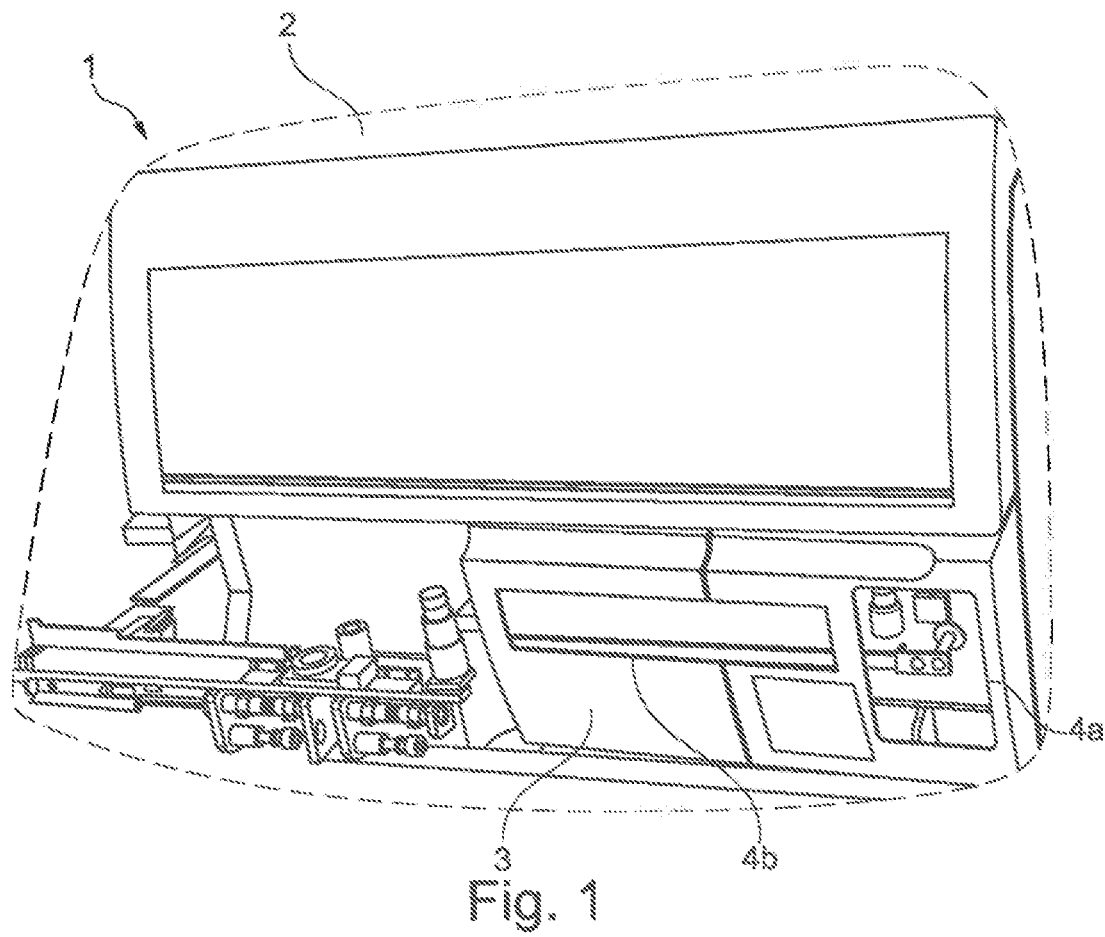

(51) Int. Cl.
| | |
|---|---|
| *G01L 3/00* | (2006.01) |
| *B01L 9/06* | (2006.01) |
| *B60P 1/00* | (2006.01) |
| *B65G 47/26* | (2006.01) |
| *B65G 54/02* | (2006.01) |
| *G01N 1/14* | (2006.01) |
| *G01N 35/00* | (2006.01) |
| *G01N 35/02* | (2006.01) |
| *G06F 17/00* | (2019.01) |
| *G07F 11/00* | (2006.01) |
| *H05B 1/00* | (2006.01) |

(52) U.S. Cl.
CPC ............. *B60P 1/00* (2013.01); *B65G 47/26* (2013.01); *B65G 54/02* (2013.01); *G01N 1/14* (2013.01); *G01N 35/00* (2013.01); *G01N 2035/00326* (2013.01); *G01N 2035/00534* (2013.01); *G01N 2035/00752* (2013.01); *G01N 35/021* (2013.01); *G01N 2035/0406* (2013.01); *G01N 2035/0408* (2013.01); *G01N 2035/0465* (2013.01); *G06F 17/00* (2013.01); *G07F 11/00* (2013.01); *H05B 1/00* (2013.01)

(58) Field of Classification Search
CPC ... G01N 2035/0408; G01N 2035/0465; G01N 2035/0406; G01N 2035/00752; B01L 3/50855; B01L 9/06; H05B 1/00; G06F 17/00; B65G 47/26; B65G 54/02; G07F 11/00
See application file for complete search history.

(56) References Cited

U.S. PATENT DOCUMENTS

| | | | | |
|---|---|---|---|---|
| 5,183,638 | A * | 2/1993 | Wakatake | G01N 35/0098 422/63 |
| 5,350,564 | A | 9/1994 | Mazza et al. | |
| 5,730,276 | A * | 3/1998 | Itoh | B01L 9/06 198/465.1 |
| 2002/0101310 | A1* | 8/2002 | Jennings | B01J 19/126 333/248 |
| 2004/0050836 | A1 | 3/2004 | Nesbitt et al. | |
| 2004/0159589 | A1* | 8/2004 | Matsumoto | G01N 35/1079 221/92 |
| 2008/0193334 | A1* | 8/2008 | Ryan | G01N 35/04 422/65 |
| 2009/0004063 | A1* | 1/2009 | Higashihara | G01N 35/1009 366/279 |
| 2010/0300831 | A1* | 12/2010 | Pedrazzini | G01N 35/04 198/339.1 |
| 2013/0125675 | A1* | 5/2013 | Muller | G01N 35/0099 73/864.23 |
| 2015/0101911 | A1* | 4/2015 | Friedman | G01N 35/04 211/81 |
| 2016/0054341 | A1* | 2/2016 | Edelmann | G01N 35/04 198/619 |

FOREIGN PATENT DOCUMENTS

| | | |
|---|---|---|
| EP | 2988134 A1 | 2/2016 |
| JP | 2004523863 A | 8/2004 |
| JP | 2006145534 A | 6/2006 |
| JP | 2007529733 A | 10/2007 |
| JP | 2009008558 A | 1/2009 |
| JP | 2011252887 A | 12/2011 |
| JP | 2014-085148 A | 5/2014 |
| JP | 2015118091 A | 6/2015 |
| JP | 2016099142 A | 5/2016 |
| WO | 96/25712 A1 | 8/1996 |

OTHER PUBLICATIONS

French Preliminary Search Report dated Jul. 24, 2017 for corresponding French Application No. 1754079.

The a Notice of Refusal issued in corresponding Japanese Patent Application No. 2018-090568; Dated: Jul. 12, 2022.

* cited by examiner

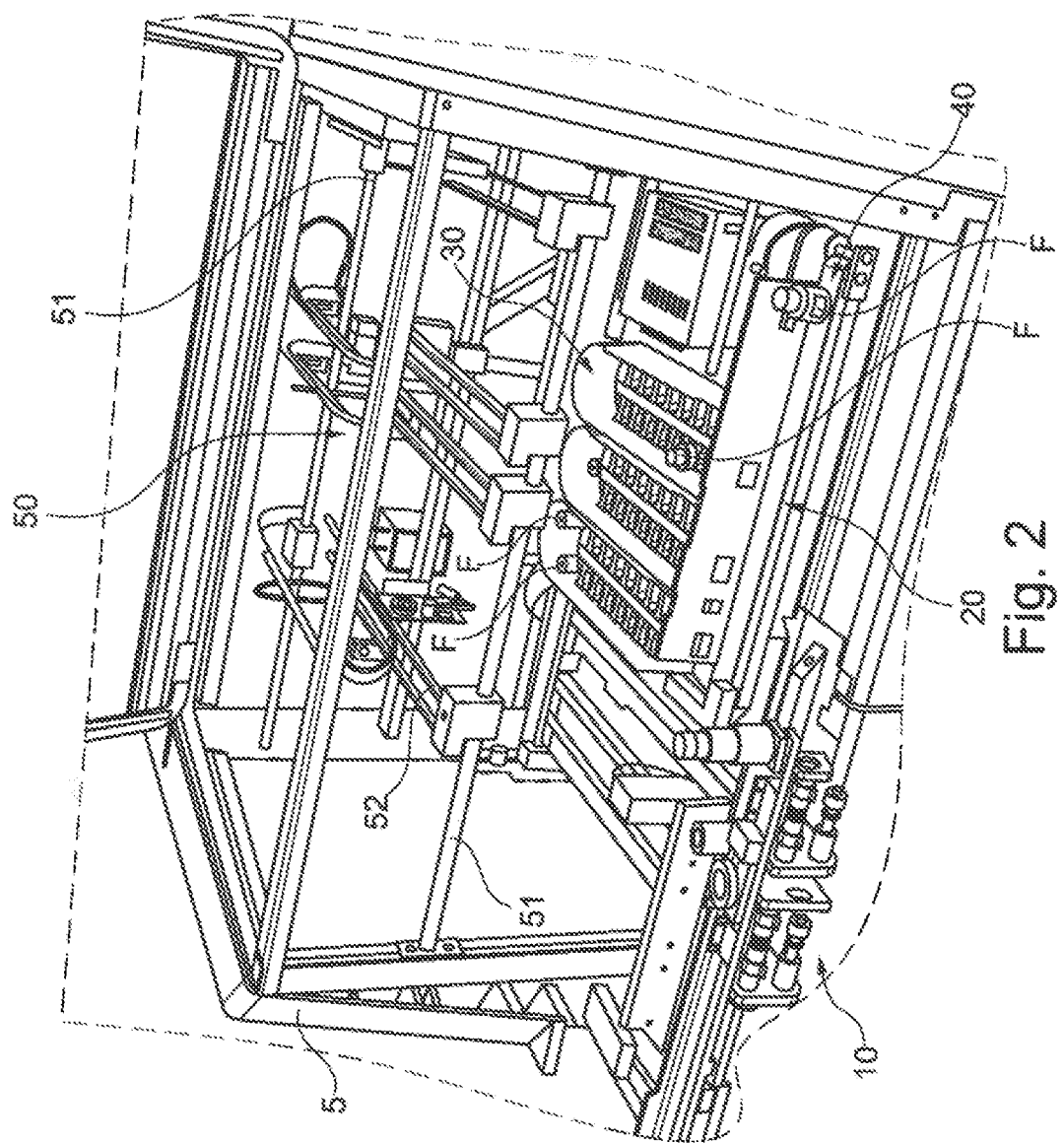

AUTOMATIC DEVICE FOR THE AUTOMATED CONDUCT OF ANALYSES, NOTABLY MEDICAL ANALYSES

The present application is a divisional application of U.S. patent application Ser. No. 15/974,772, filed on May 9, 2018, which claims priority to French Patent Application No. 1754079 filed on May 10, 2017, the contents of which are all incorporated by reference.

The present invention concerns automatic devices for the automatic conduct of analyses, notably medical analyses, more particularly but not in any limiting way in the field of hemostasis and thrombosis.

Numerous automatic devices function by introducing one or more chemical or biological reagents into containers containing the sample to be tested, then measuring at least one physical parameter representing the property of the sample that the aim is to highlight.

The reagents are contained in open bottles in order to enable sampling by means of pipettes.

In some automatic devices, the bottles containing the reagents are received in a storage zone defined by a drawer mobile relative to a frame of the automatic device to take up a loading position enabling their replacement. When the drawer is open, the functioning of the automatic device is interrupted, which reduces the rate at which the analyses are effected. Moreover, the presence of an operator must be scheduled so as to effect this replacement as soon as the requirement exists, at the risk of compromising the efficiency of the automatic device.

In other automatic devices, the bottles are mounted on racks that can be extracted from the frame independently of one another, which can enable the automatic device to continue to effect analyses provided that the necessary reagents remain available in the bottles still present on the racks in place. The construction of the automatic device is more complex; the advance resulting from the possibility of reloading a rack independently is highly dependent on the nature of the reagents present in the remaining racks and the analysis to be effected, and can therefore prove relatively limited in practice.

Thus there exists a requirement to improve further automatic analysis devices in order to facilitate the operation of replacement of the reagents and in particular to enable the automatic device to continue to function normally during this operation.

According to a first of its aspects, the invention therefore consists in an automatic device for the automated conduct of analyses, notably medical analyses, including:

a storage zone for bottles, an automated sampling system for selectively sampling the content of a bottle among those present in the storage zone, a loading zone for receiving a new bottle, an unloading zone for collecting a bottle previously present in the storage zone, a bottle conveyor and storage system, configured selectively and individually to transport a bottle from a location in the storage zone to the unloading zone or from the loading zone to a location in the storage zone.

The invention enables the automatic device to continue to function while loading or unloading a bottle, with bottles already in place in the storage zone. The efficiency of the automatic device is enhanced by this.

Moreover, the storage zone is preferably air-conditioned. The invention makes it possible to avoid moving a rack or a drawer and disturbing the air-conditioned environment in which the other bottles are placed. The control of the temperature of the bottles is improved and the risk of condensation is limited. Not having to take out the bottles during use furthermore makes it possible to reduce losses by evaporation.

In one embodiment of the invention, the conveyor and storage system includes at least one storage module defining at least a part of the storage zone and a bottle entry/exit zone. This module is preferably provided with means for driving bottles within it in a closed loop, enabling selective positioning of a bottle in the entry/exit zone of the module.

The possibility of driving the bottles in the storage module in a closed loop simplifies the production of the means for transporting the bottles to and from the storage module, because it suffices to move the bottle into the entry/exit zone of the module or to recover it there. Moreover, if required it is possible to position the bottles in a module so as to optimize the movements of the automatic sampling system, and in particular to minimize the movements of the pipette tool. Alternatively, the pipette tool can be moved to follow the movement of a bottle and thus to enable sampling while the bottle is moving.

If necessary, each storage module enables movement of the bottles into sub-zones appropriate to their content or to the reaction to be effected, for example a colder, less cold sub-zone and/or without stirring.

The automatic device may include a plurality of juxtaposed identical storage modules. Producing the storage means in modular form makes it possible to adapt the storage capacity of the reagent bottles to the requirements of the automatic device optimally and at lower cost and facilitates maintenance.

The or each storage module is preferably removably mounted in the automatic device. In particular, the or each module may be received in a corresponding housing of the automatic device, including a locking lever on which an operator can act to free the module for its removal from the automatic device.

The automatic device preferably includes a lid at the top that when open allows access to all of the storage modules.

The automatic device may include under the storage module or modules air-conditioning means, for example adapted to blow air at a controlled temperature in the direction of the modules and/or to effect cooling by conduction, for example including one or more Peltier-effect modules.

The or each storage module preferably includes a belt carrying separators defining between them housings receiving bottles. The belt may in particular be tensioned between front and rear wheels and have two rectilinear portions between these wheels. The or each module may include a casing having a curved portion guiding the bottles present between the separators in their movement around the rear wheel. During their movement inside the storage module, the bottles slide on a plate defining the bottom of the compartments receiving the bottles. This plate is advantageously a metal plate, preferably an aluminum plate. This can encourage the production of a homogeneous bottle storage temperature. Moreover, if the pipette tool employs capacitive sensing of the liquid level in the bottle, the electrically conductive nature of the plate is favorable to reading this off.

The separators are preferably fixed to the belt at regular intervals.

Each separator preferably has an asymmetric shape with respect to a median plane intersecting its base at half-width; each separator may include a head that is deeper in the direction of advance of the belt, in order to facilitate the capture of a new bottle and its transit inside the module.

Each separator may be fixed to the belt in a median zone and have at its ends returns in the direction of the belt, which limit the clearance with respect to the latter and tend to orient the separator perpendicularly to the belt. The median zone fixed to the belt is preferably situated at the level of a tooth of the latter, which reduces the risk of the separator being torn off on passing the drive wheels.

The or each module may include a plurality of pulleys each carrying at least one permanent magnet, the pulleys being disposed so that each generates as it rotates a rotating magnetic field for driving a stirring rod present in a bottle at a corresponding location on the module. The pulleys are preferably driven by the same belt circulating between them. This belt may be driven by a single motor.

In one embodiment of the invention, the conveyor and storage system includes a transport mechanism configured to transport a bottle from the loading zone to the module in which it must be stored or to the unloading zone from a module in which it was stored.

This transport mechanism may include a front belt and a rear belt that are preferably parallel to one another, the rear belt providing at least a part of the transport from the loading zone to the module that has to receive the bottle and the front belt at least a part of the transport to the unloading zone. The front and rear belts are preferably driven in opposite directions by the same motor.

The transport mechanism may include a deflector that expels any bottle driven against it by the rear belt toward the front belt. The rear belt may be slightly raised relative to the front belt to facilitate the passage over the front belt. The rear belt may be slightly inclined toward the front belt in order to facilitate sliding of the bottle on the front belt.

The automatic device preferably includes a mechanism for controlling the spacing between the bottles on the rear belt. This spacing control mechanism may include upstream and downstream pusher members mobile between retracted positions enabling the passage of bottles driven by the rear belt and deployed positions blocking the passage of the bottles. The distance between the pusher members is preferably chosen to trap a single bottle between them when they are in the deployed position. This mechanism enables precise control of the distance travelled by a bottle on the rear belt from the moment it is released by the downstream pusher member so that it may be moved accurately to the entry/exit of the module that it must integrate. The portion of the rear belt extending between the loading zone and the upstream pusher member may constitute a buffer zone in which the loaded bottles can accumulate before being transferred to the storage module(s). The waiting bottles may slide on the rear belt when the latter is moved and their advance movement is blocked by the upstream pusher member.

The path of a bottle driven around the front wheel of a storage module preferably passes over the rear belt, which is preferably situated at the same height as the plate constituting the bottom of the compartments formed between the separators inside the storage module. This enables the storage module to capture a bottle present on the rear belt and to deposit on the rear belt a bottle to be extracted from the module. During the combined closed loop movement of the bottles necessary to move a given bottle onto the rear belt, the bottles may slide on the rear belt when pushed by the corresponding separators. The shape of the latter ensures that the bottles continue to be driven correctly by the separators when they move on the rear belt in accordance with a semi-circular trajectory, because of the effect of the pushing by the corresponding separators. The rear belt may be driven in movement during the combined movement of the bottles so as to maintain each bottle that passes over the rear belt pressed onto the corresponding separator, and thus to facilitate the driving of that bottle by the separator.

Each module may receive two rows of bottles in housings present between two consecutive separators within each row. An additional bottle may be contained in a space to the rear of the rows, between the two rearmost separators of the rows; another bottle may be present between the two most forward separators, on the rear belt. The loading capacity of a module may therefore be equal to the number of separators of that module.

All the bottles may be the same size, which may correspond to a maximum bottle size that can be received in the storage zone, in particular in a compartment of a module defined between two separators.

To enable the use of bottles of smaller capacity, adapters may be used. At least one bottle of smaller size can therefore be received in an adapter the outside diameter of which corresponds to that of the largest size bottles. The adapter may define a housing coaxial with the bottle to be received, the bottle remaining vertical. For smaller bottles, the adapter may have an inclined and off-center housing, so that the opening of the bottle remains centered. This enables the dregs of reagent in the bottle to be sampled more easily, and therefore waste to be minimized. The capacity of the bottles ranges for example from 5 to 30 ml.

The bottles preferably carry an identifier, for example in the form of a bar code or the like. The automatic device includes at least one sensor for reading this identifier. Accordingly, when a bottle is transported toward the storage zone, the bottle is identified. The above adapters preferably enable the reading of the identifier of the bottle or themselves carry an identifier.

The invention also consists in a method of managing a set of bottles in an automatic device as defined above, including the steps consisting in:

transporting a bottle from the loading zone to the storage zone and disposing the bottle at a predefined location thereof, or transporting a bottle from a predefined location of the storage zone to the unloading zone.

This method may include the step consisting in combined movement of the bottles of a storage module as defined above by driving the belt in one direction, until the bottle to be removed from the module is moved onto the rear belt, then moving the belt in the opposite direction to move away the separator that has pushed the bottle onto the rear belt and to free the bottle to allow it to continue on its path by being driven by the rear belt.

The method may include the step consisting in moving the downstream plunger into the deployed position and the upstream plunger into the retracted position, using the rear belt to move a bottle coming from the loading zone until it is pressed against the downstream plunger, stopping the movement of the rear belt, moving the upstream plunger into the deployed position, then moving the downstream plunger to the retracted position and restarting movement of the rear belt so as to position the bottle in front of the storage module that has to integrate it.

The belt of the storage module may then start to move so that a free separator captures the bottle present on the rear belt.

The method may include the storage of a table of correspondences between identifiers of the bottles present in the module or modules and the locations receiving bottles defined by the module or modules, and updating this table on each movement of bottles within a module. This table of correspondences is used by the sampling system to place a pipette in the correct bottle.

Figure 3:
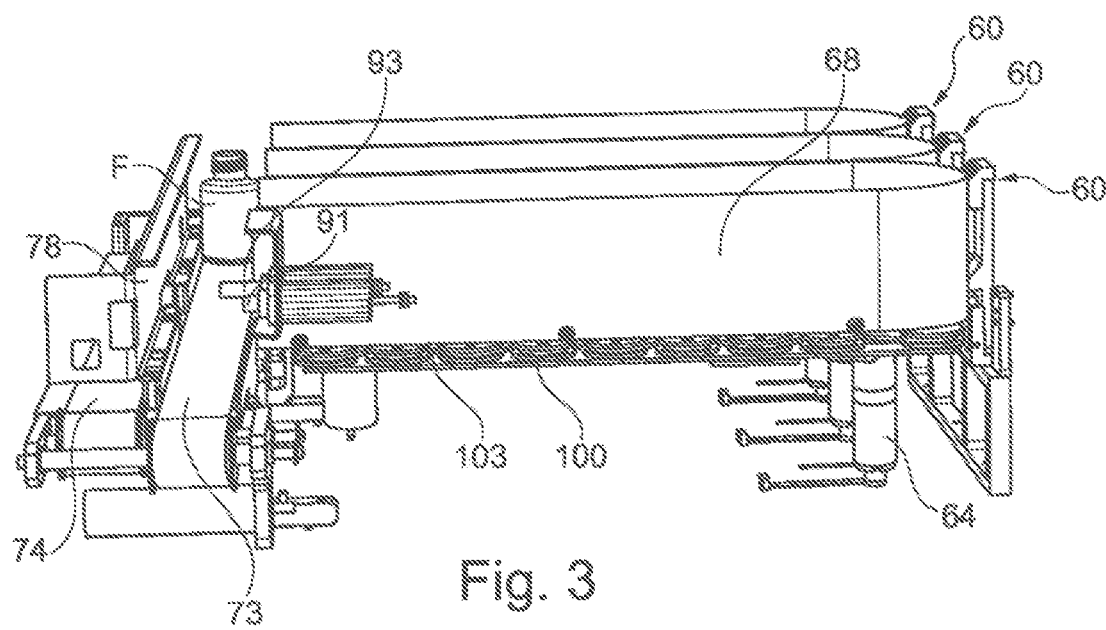
Figure 4:
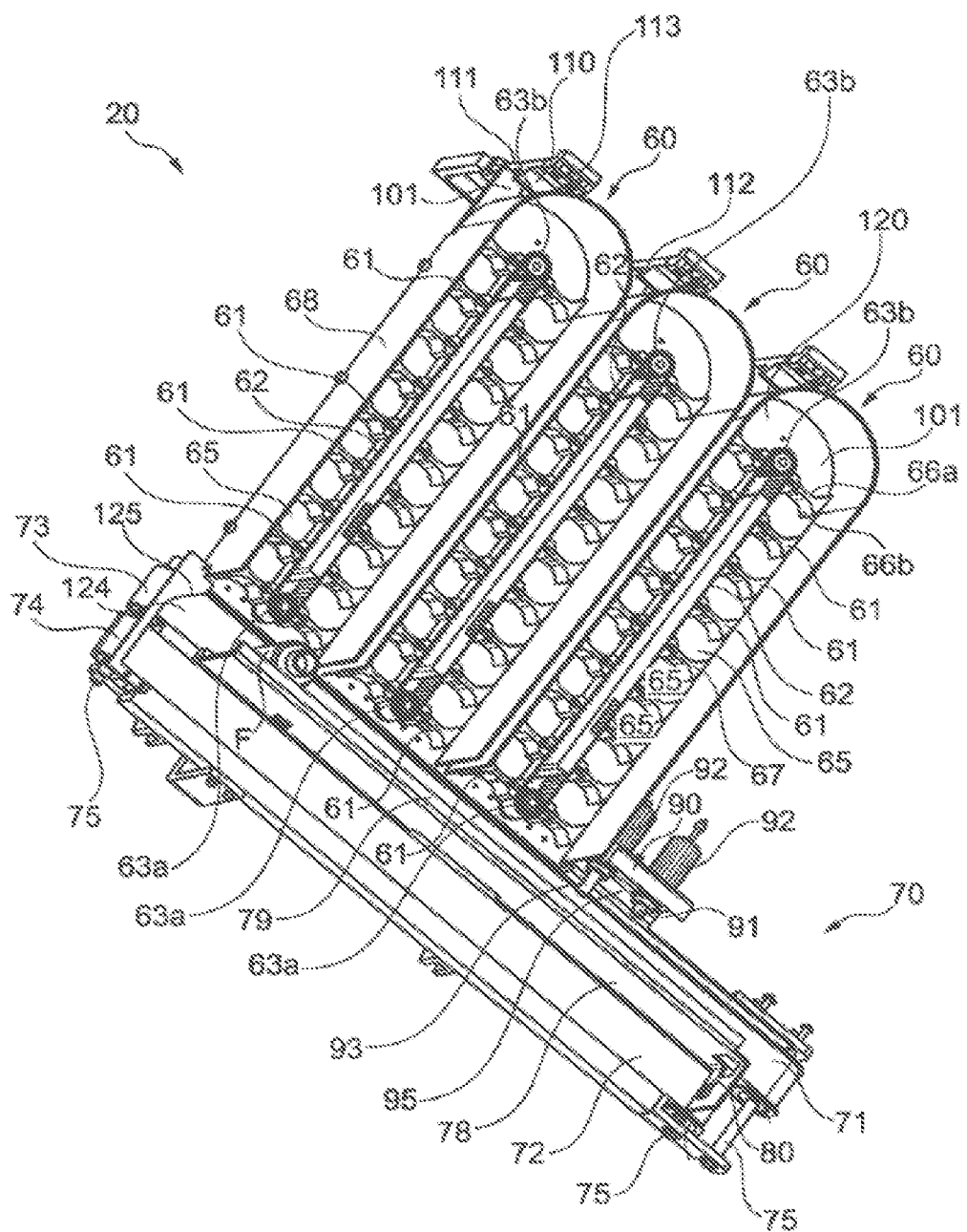
Figure 5:
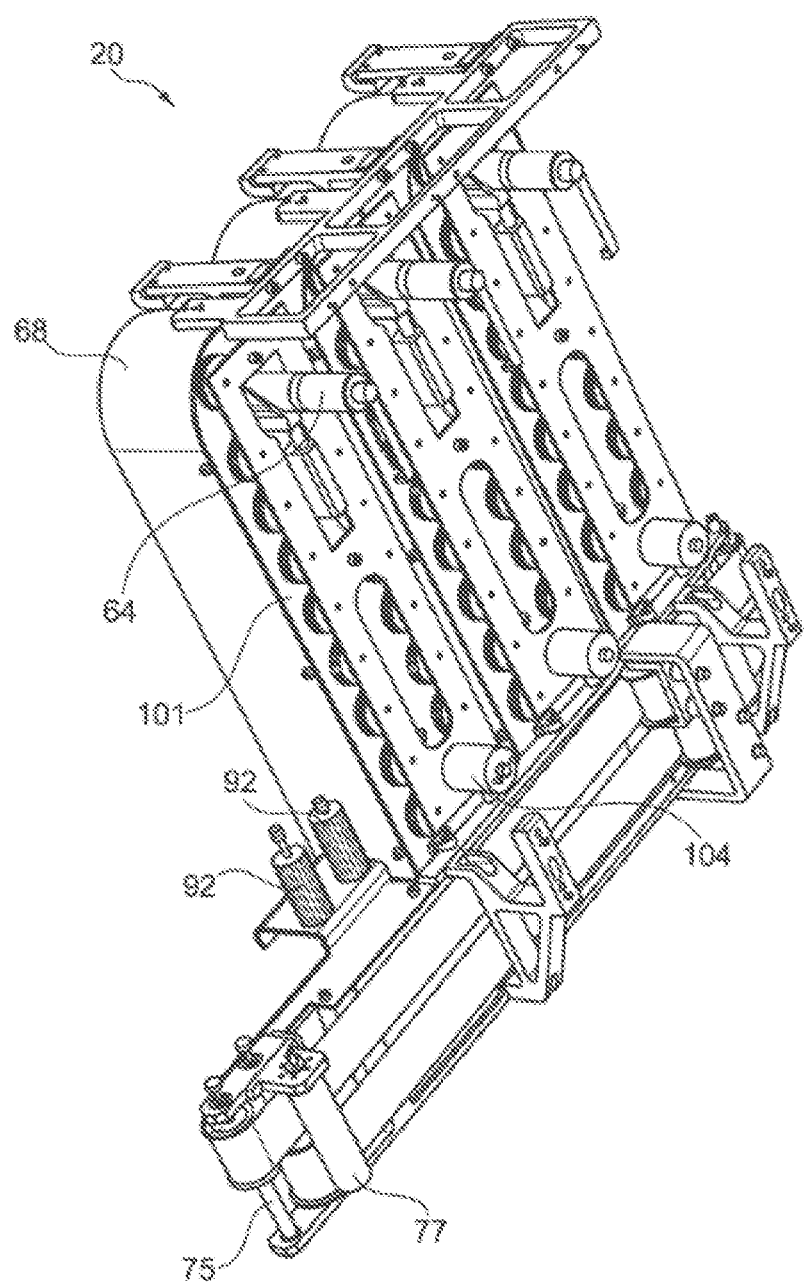
Figure 6:
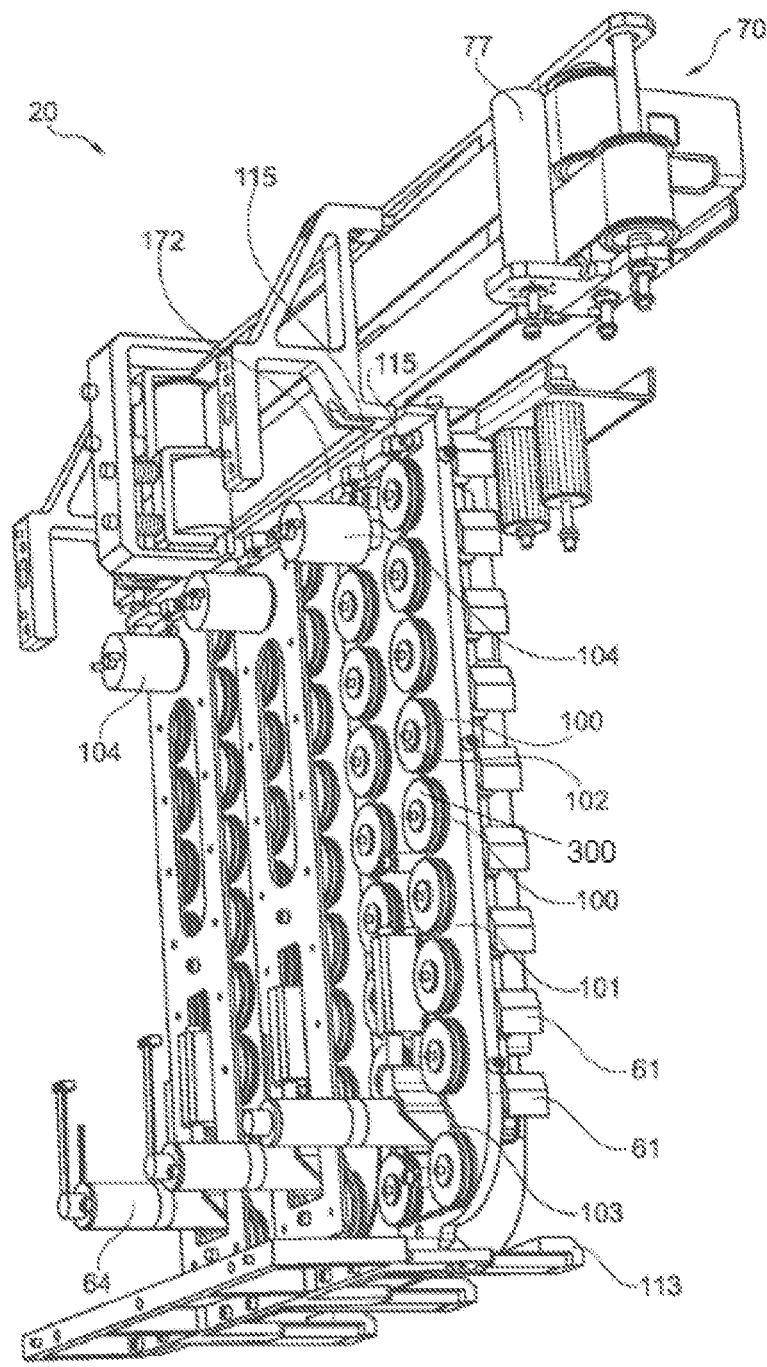
Figure 7:
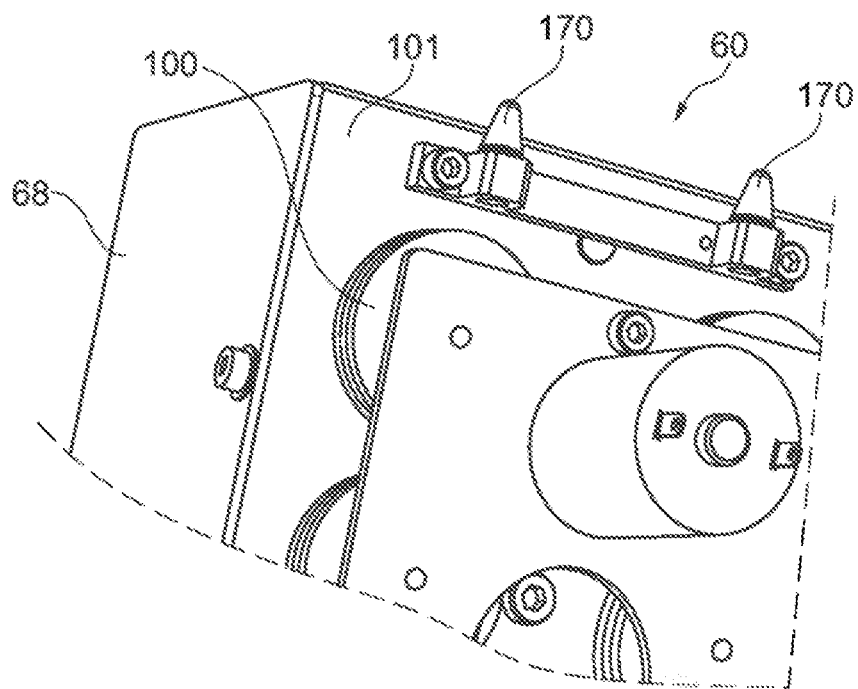
Figure 8:
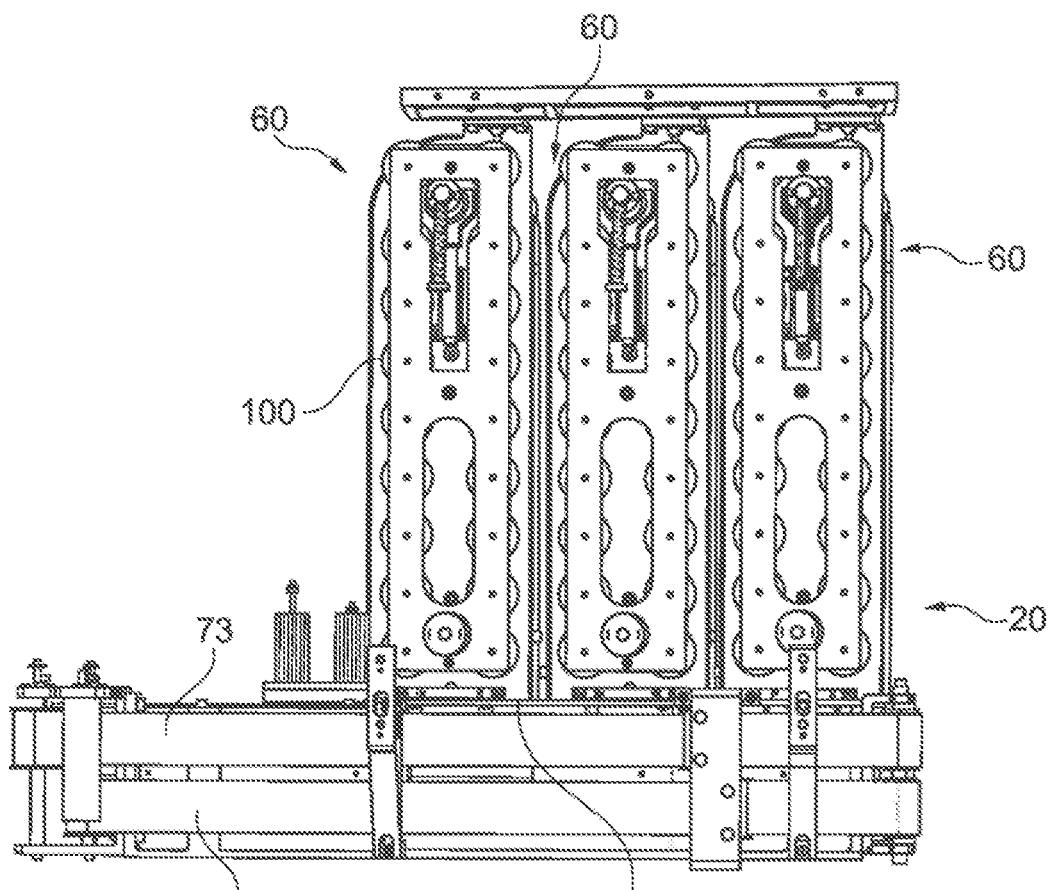
Figure 9:
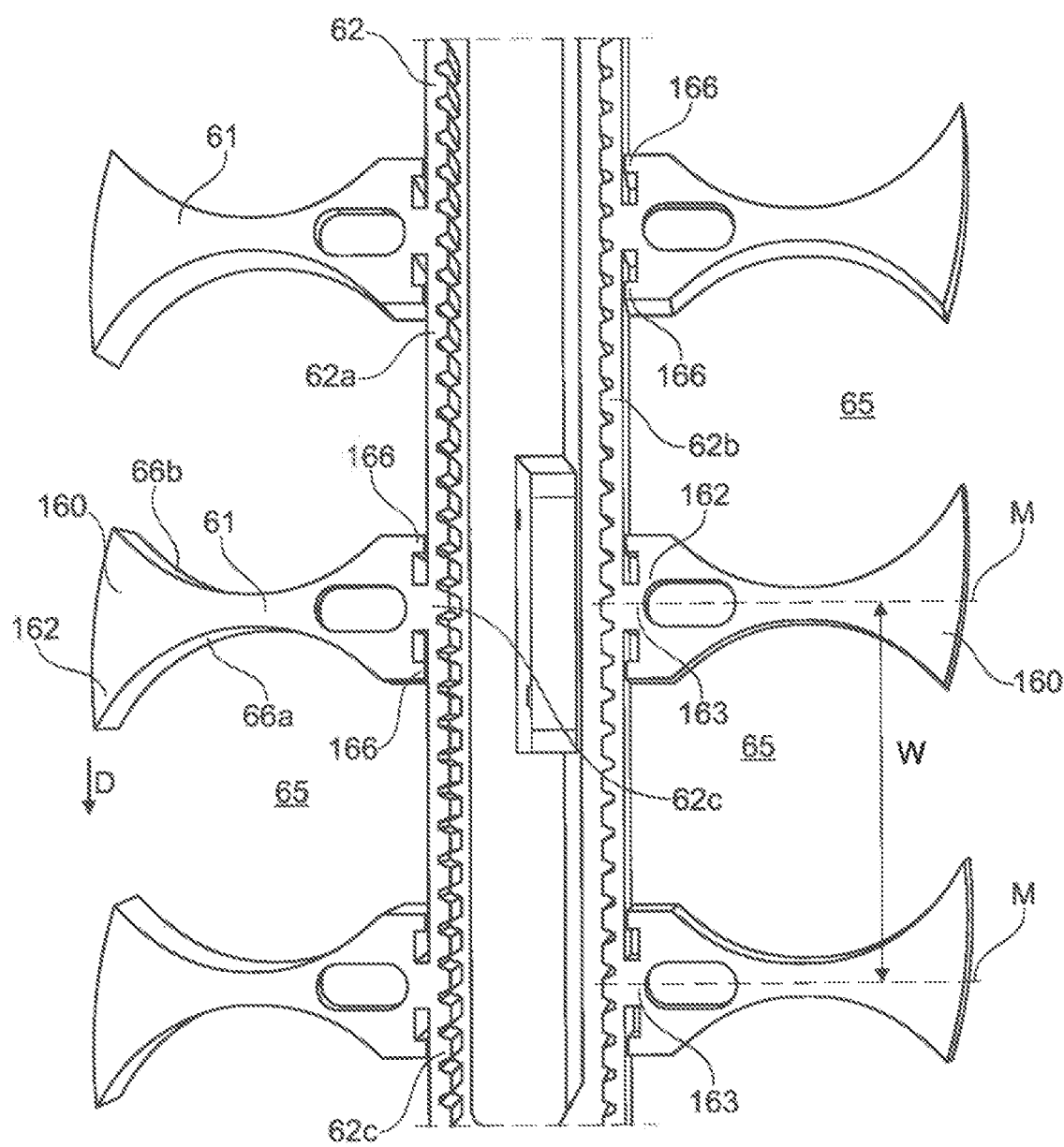
Figure 10:
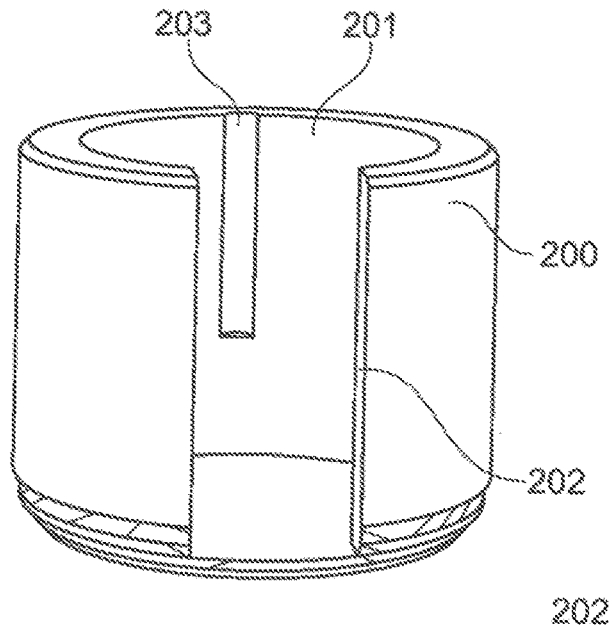
Figure 11:
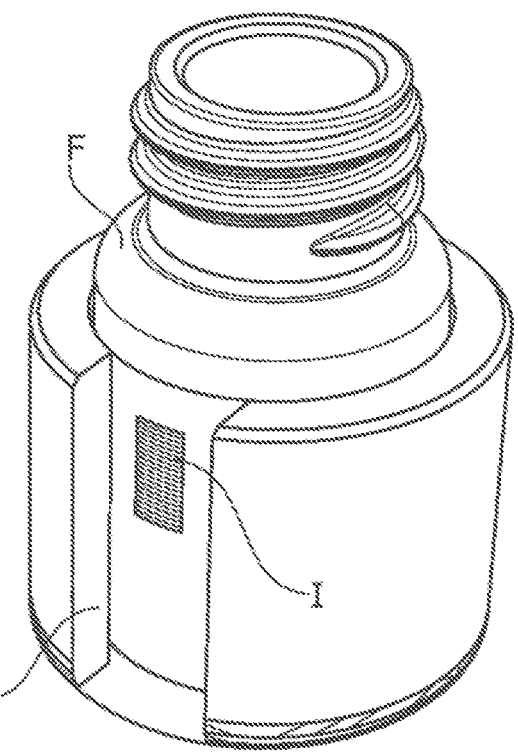
Figure 12:
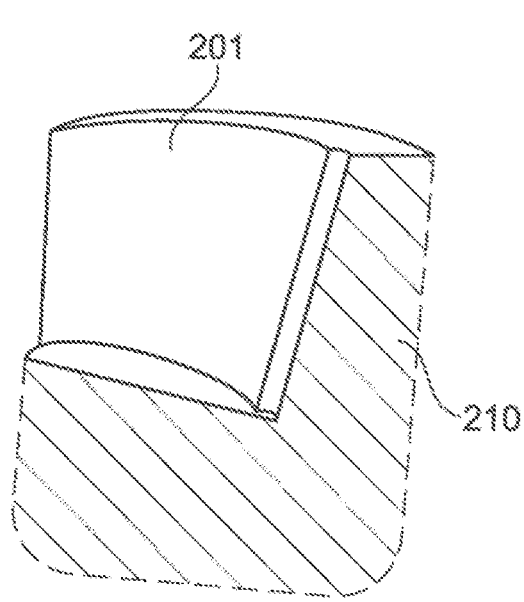
Figure 13:
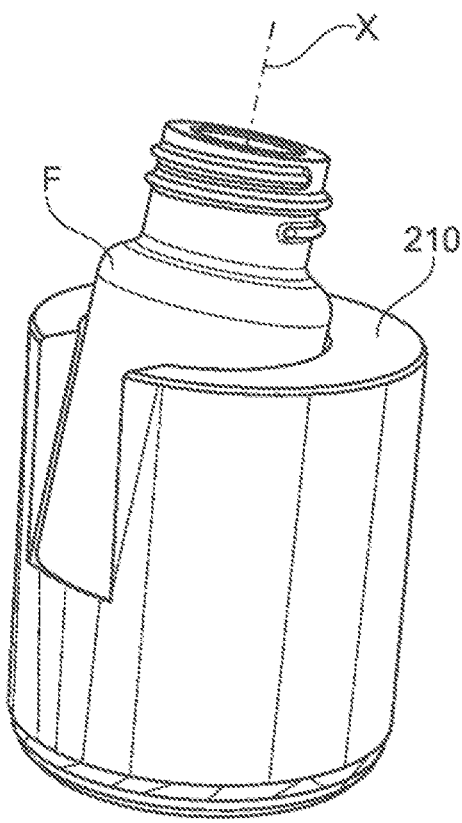

The invention will be better understood on reading the following detailed description of one nonlimiting embodiment thereof and examining the appended drawings, in which:

FIG. 1 is a partial diagrammatic representation in perspective of an automatic device conforming to one embodiment of the invention, FIG. 2 represents the automatic device from FIG. 1 after opening the top lid and removing a front panel, FIG. 3 represents the conveyor and storage system separately, diagrammatically and in perspective, FIG. 4 is a top view of the conveyor and storage system from FIG. 3, FIG. 5 is a bottom view of the conveyor and storage system, FIG. 6 represents the conveyor and storage system after removal of the casing of a module and the protecting bottom plate, FIG. 7 represents a constructional detail of a module, FIG. 8 is a bottom view of the conveyor and storage system, FIG. 9 illustrates more particularly the fixing of the separators to the belt, FIG. 10 represents separately a first bottle adapter, FIG. 11 represents the adapter from FIG. 10 with the bottle in place, FIG. 12 is a diagrammatic axial section of a variant bottle adapter, and FIG. 13 represents the adapter from FIG. 12 equipped with a bottle.

The automatic device 1 represented in FIGS. 1 and 2 includes a casing comprising a lid 2 at the top and a set of panels on the various sides, including a front panel 3 including an access opening 4a to a zone 71 for loading bottles F and an access opening 4b to an unloading zone 40 enabling recovery of empty bottles F or bottles that are no longer to be used by the automatic device.

The top lid 2 is for example shown hinged to a frame 5 of the automatic device 1, visible in FIG. 2. This frame 5 serves as a support for a system 10 for conveying samples to be analyzed and a conveyor and storage system 20 according to the invention, enabling movement of the bottles F containing reagents used for the analysis into a storage zone 30 in which the bottles F are stored and selective removal of one or more bottles F from this zone 30 in order to transport them to the unloading zone 40.

The automatic device 1 includes a pipette system 50 mobile on horizontal rails 51 for sampling the reagents in the bottles F and bringing them into contact with the samples in order to effect the analyses, in a manner known in itself.

The pipette system 50 is known in itself and is not described in more detail hereinafter, including drive means enabling movement on the rails 51 of a gantry 52 enabling up and down movement of the pipette tool.

The bottles F have in the upper part a neck O which, if necessary, may be restricted by a flow reducer. This neck defines an opening through which the needle of the pipette tool can pass during sampling.

The automatic device 1 includes an electronic control circuit enabling automatic control of the functioning of the various motorized mechanism. If necessary, this electronic circuit may communicate with a remote computer, not shown, that enables the display of information relating to the functioning of the automatic device, recovery of the data resulting from the analyses, and action on the functioning of the device.

The conveyor and storage system 20 is shown more precisely in FIGS. 4 to 9. In the example considered here, this system includes three identical storage modules 60 enabling storage of the bottles F.

The number of modules 60 may be different, and in a variant in which the number of bottles F is smaller, the system 20 may include only one of them, for example.

The system 20 also includes a transport mechanism 70 that is coupled to the modules 60 and on the one hand enables a bottle F to be transported from the loading zone 71 to the module 60 concerned and on the other hand enables a bottle ejected by one of the modules 60 to be transported to the unloading zone 40 after use by the automatic device.

In the example considered here, the transport mechanism 70 includes a front conveyor belt 74 and a rear conveyor belt 73 extending substantially parallel to one another. The belts 73 and 74 are toothed on their interior face, smooth on their exterior face and mounted on pulleys rotating about shafts 75.

In the example considered here, the belts 73 and 74 are driven by the same motor 77, visible in FIG. 5, a transmission that is not shown enabling coupling of the movements of the drive pulleys. The belts 73 and 74 move in opposite directions.

A guide rail 78 visible in FIG. 4 is disposed between the belts 73 and 74. This rail 78 has an upper edge 79 directed rearwardly, the distance of which from the rear belt 73 is greater than the height of the body of a bottle F and less than the total height of the bottle, as can be seen in FIG. 4.

An abutment 80 is disposed at the end of the front belt 74 that is adjacent the loading zone 71, to stop the bottles present thereon.

The transport mechanism 70 includes a system 90 enabling selective immobilization of a bottle present on the rear belt 73 and control of the spacing between a plurality of bottles F introduced successively into the loading zone 71 and moved by the rear belt 73 toward the modules 60. As shown here, this system 90 may include two upstream and downstream pusher members 91, 93 each actuated by a corresponding electromagnet 92 between a deployed position and a retracted position.

The front pusher member 93 may remain deployed when the downstream pusher member 91 is retracted, as shown in FIG. 4, until a bottle F comes to bear against the downstream pusher member 93. The rear belt 73 may then be stopped and the upstream pusher member 91 deployed. The separation between the pusher members 91 and 93 is chosen so that the pusher member 91 can be deployed without being blocked by the body of the bottle F abutted against the downstream pusher member 93. The upstream pusher member 91 can move away the immediately next bottle F on the rear belt 73. The bottle F present in the waiting zone 95 situated between the two pusher members 91 and 93 is therefore separated from the next bottle by a predefined distance, corresponding to the diameter of the upstream pusher member 91. To free the bottle F present in the waiting zone 95, the downstream pusher member 93 is retracted, which allows the bottle F to continue its movement, driven by the rear belt 73. The movement of the rear belt 73 is interrupted when the rear bottle F is placed in front of the entry/exit zone of the module 60 that has to recover it. The rear belt portion situated upstream of the upstream pusher member 91 can serve as a buffer zone for accumulating bottles awaiting transfer to the modules 60. The bottles F can slide on the rear belt 73 when the latter tends to driven them against the upstream pusher member 91 and they are not immobilized by the latter.

The automatic device 1 includes a reader not shown in FIG. 4 enabling reading of an identifier carried by the bottle F present in the loading zone 71, for example a bar code or the like or an RFID chip.

Each module 60 includes a belt 62 mounted on a front wheel 63a and a rear wheel 63b so as to have between the latter two parallel rectilinear portions 62a and 62b, as can be seen more particularly in FIG. 9. The belt 62 is toothed on its interior surface for driving purposes, and carries externally separators 61, also referred to as cleats, which are for example fixed by gluing or welding to the belt 62. The rear wheel 63b is driven by a motor 64.

Inside the module 60 the separators 61 along the rectilinear portions of the belt 62 define between them housings 65, also termed compartments, each adapted to receive a bottle F. Each separator 61 has two opposite faces 66a and 66b that are concave on the outside, matching the curvature of the bottle F. The separators 61 have on the side opposite the belt 62 a head 160 the shape of which is adapted to capture a bottle F present on the rear belt 73 in the entry/exit zone of the module 60.

In particular, the separator 61 can be asymmetric relative to a median plane M intersecting the base 162 of the separator at half-width. As shown here, the head 160 may include an extension 161 that is deeper in the direction D of advance of the belt 62.

Each separator 61 may be fixed to the belt 62 by a median zone 163 at the level of a tooth 62c of the latter. The base 162 can have at its ends returns 166 toward the belt 62 which limit the clearance from the latter and enable orientation of the separator 61 substantially perpendicularly to the belt 62.

As can be seen in FIG. 4 in particular, each module 60 includes a casing 68 that is open at the front and curved at the rear so as to guide the movement of the bottles around the rear wheel 63b. The casing 68 has plane vertical walls along rectilinear portions of the belt 62.

The bottles F may contain a magnetic rod serving as a stirrer. To cause this rod to rotate inside the corresponding bottle, each module 60 may include, as seen in FIG. 6 in particular, a set of pulleys 100 each mounted to rotate about a shaft 102 under a plate 101 constituting the bottom of the housings 65 receiving the bottles. Each pulley 100 carries one or more permanent magnets 300 that are driven in rotation with it so as to create under the plate 101 rotating magnetic fields for driving the magnetized rods in rotation.

The pulleys 100 are driven by a belt 103 that is driven by a motor 104.

The plates 101 are preferably aluminum plates.

Each of the modules 60 may be retained fixedly in place with the aid of a locking system 110 including a lever 111 provided with a locking tooth 112 coming to bear on the top of the plate 101 at the rear of the casing 68. The lever 111 may include, as shown in FIG. 4, a button 113 at its free end, provided for example with an indication reminding the operator that it is necessary to push on it to proceed to unlock the module.

Each module 60 is attached at the front by pins 170, visible in FIG. 7, which engage in corresponding housings formed in a plate 172 of the transport mechanism 70, visible in FIG. 6 in particular.

To remove a module 60, for example in order to clean it, the user presses the button 113 of the corresponding locking system 110, which releases the rear edge of the module 60 and enables it to be moved rearwardly to disengage the pins 170 from their corresponding housings. The operator then unplugs the connectors that connect the motors 64 and 104 to the control circuit of the automatic device.

One of the separators 61 of a module 60 carries a permanent magnet and this module includes a sensor that enables detection of the passage of that separator in the vicinity. This enables a reference to be provided as to the position of the belt 62 on each turn thereof. The motor 64 driving the rear wheel 63b is provided with a coder that also enables the movement of the belt 62 to be known.

As can be seen in FIG. 4 in particular, the belt 62 is sized so that the separators 61 are disposed in opposed pairs in a pipette configuration, defining two rows of eight housings 65 in the example considered here. A bottle can equally be contained in the rearmost space formed between the rearmost separators 61 of the left and right rows and on the rear belt 73 between the two most forward separators 61 of the left and right rows of the module 60, which increases the total loading capacity per module 60 to 18 bottles in the example considered here. The movement of the belt 62 by a distance corresponding to the spacing w between two median planes M causes the separator 61 present at the front end of the left row to take the place of the one present at the front end of the right row, and that present at the rear end of the right row to take the place of that present at the rear end of the left row, with the direction D of advance shown.

The conveyor and storage system 20 operates as follows.

Successive bottles F containing reagents are disposed manually in the loading zone 71 and then transported by the rear belt 73 to the modules 60 intended to receive them. The system 90 described above regulates the spacing between them.

It is assumed that the module 60 that has to receive this bottle no longer contains any bottle between the separators 61 situated at the front ends of the left and right rows and that the most forward housing 65 of the left row is empty.

Once a bottle has arrived in front of this module 60, the belt 62 thereof is actuated so that the separator 61 situated at the front end of the left row captures the bottle and drives it into the module 60. The bottle is then contained inside this module in the housing 65 formed between this separator 61, which has just moved over the rear belt 73, and the adjacent separator 61, namely the separator 61 that was previously that at the front end of the right row. During this operation, any bottles F present in the other housings 65 of this module have moved along the straight portions of the belt 62 by a distance w that substantially corresponds to the pitch at which the separators 61 are fixed to the belt. The automatic device takes account of this combined movement of the bottles F present in the module 60 to update a table of correspondences between each of the housings 65 of the various modules 60 at all times and the identity of the corresponding bottles.

When the belt 62 turns, the bottle present in the rearmost compartment 65 of the right row is driven by a separator 61 at the beginning of the curved portion of the casing 68 and is no longer held between two separators 61. There is therefore an uncertainty as to its precise position and the automatic device is advantageously such that no sampling is effected in this bottle, in order not to risk the pipette tool not being positioned precisely above the opening of this bottle. Sampling is also prohibited from the bottle F that is situated between the two most forward separators 61 of the left and right rows on the rear belt 73. Sampling is therefore preferably effected only in the bottles F that are held between two separators 61.

To extract a bottle F present at a given location of a module 60, the belt 62 is started and moved a sufficient distance to bring the bottle on the rear belt 73 into the entry/exit zone of the module. The rear belt 73 is advantageously moving during the rotation of the belt 72 in order to generate an opposite force on the bottle F, enabling it to be held against the face 66*a* of the corresponding separator 61. A plurality of bottles F can be made to move on this rear belt 73 to accompany the movement of the separators 61 around the front wheel 63*a*.

When the bottle F to be ejected reaches the end of the rectilinear portion of the belt 62, the separator 61 that has pushed it that far effects only a quarter-turn and the bottle F stops on the rear belt 73. The belt 62 is then driven by a quarter-turn in the opposite direction so that the separator 61 releases the bottle F. The latter can then be driven by the rear belt 73 as far as the end 124 thereof opposite the loading zone 71.

A deflector 125 is disposed at this end so as to expel the bottle reaching it toward the front belt 74, which is turning in the opposite direction.

To facilitate transfer from one belt to the other, the rear belt 73 can be raised slightly relative to the front belt 74 and the rear belt 73 can be inclined slightly toward the front belt 74.

Once the bottle F has arrived on the front belt 74, it may be driven as far as the unloading zone 72 where it may be recovered either manually by the operator responsible for monitoring the functioning of the automatic device or taken up by an auxiliary conveyor system that enables it to be driven to another recovery zone.

During the sampling of the content of a bottle by the pipette tool, the latter may proceed to a capacitive measurement of the level of the reagent in the bottle by detecting a change of capacitance caused by the immersion of the needle in the liquid. The presence of the aluminum plate 101 tends to facilitate reading this off.

The automatic device includes means for regulating the temperature of the storage zone 30 by blowing cold air onto the bottom of the modules 60. The fact that the latter are made of aluminum tends to homogenize the temperature. Instead of this or in addition to this the temperature is regulated by conduction, for example using one or more Peltier-effect modules.

The housings 65 of the storage modules are designed to receive bottles F of the same size. If it is necessary to use bottles of smaller capacity, it may be useful to dispose these bottles in adapters the outside diameter of which corresponds to that of the bottles F intended to be received as such in the housings 65. Examples of such adapters are represented by way of example in FIGS. 10 to 13.

In the example from FIGS. 10 and 11, the adapter 200 includes a body that defines a housing 201 to receive a bottle F of intermediate size, smaller than those intended to be received directly in the housings 65. This adapter 200 may have an opening 202 that enables the optical reading of an identifier I present on the bottle, for example a bar code. The groove 203 present opposite the opening 202 can receive a spring (not shown) that immobilize the bottle inside the adapter and prevents any rotation of the bottle relative to the adapter when reading the bar code.

In the example from FIGS. 12 and 13, the bottle is of even smaller size. The adapter 210 is such that the longitudinal axis of the bottle is oriented obliquely with its opening centered, as seen from above, relative to the outside diameter of the adapter.

The invention is not limited to the example that has just been described. For example, the automatic device is provided with an additional conveyor system on which the bottles to be loaded into the automatic device are deposited one after the other, and this conveyor system feeds the loading zone 71 with bottles.

A mechanism may be provided to drive rotation of the bottles on themselves during their transportation or in the loading zone so as to facilitate optical reading of an identifier present thereon.

The transport mechanism 70 may be produced differently, for example with two motors each for driving a corresponding belt, or with a single belt twisted on itself.

The invention claimed is:

1. A method of managing a set of bottles in an automatic device, the automatic device including:
    a storage zone for storing the set of bottles,
    an automated sampling system for selectively sampling contents of respective bottles among the set of bottles stored in the storage zone,
    an access opening to a loading zone,
    the loading zone being configured to introduce a new bottle that was not already stored in the automatic device into the automatic device,
    an access opening to an unloading zone,
    the unloading zone configured to enable recovery of empty bottles or bottles that are no longer to be used by the automatic device,
    a bottle conveyor and storage system, configured selectively and individually to transport the bottles among the set of bottles stored in the storage zone from a first location in the storage zone to the unloading zone and the new bottle from the loading zone to a second location in the storage zone,
    the bottle conveyor and storage system including an at least one storage module defining at least a part of the storage zone and a bottle entry/exit zone to the at least one storage module, the at least one storage module being provided with means for driving the set of bottles within the at least one storage module in a loop, to enable selective positioning of a bottle among the set of bottles in the entry/exit zone,
    the at least one storage module including a module belt, carrying separators defining between housings receiving bottles among the set of bottles,
    the method including:
    transporting a bottle among the set of bottles from the loading zone to the storage zone and disposing the bottle at a predefined location thereof, or
    transporting the bottle from the predefined location of the storage zone to the unloading zone,
    the bottle conveyor and storage system including a rear belt, the rear belt providing at least a part of the transport from the loading zone to the at least one storage module to receive the new bottle,
    the method including the step consisting in combined movement of the bottles of the at least one storage module by driving the module belt in one direction, until a bottle among the set of bottles to be removed from the at least one storage module is moved onto the rear belt, then moving the module belt in the opposite direction to move away the separator that has pushed the bottle onto the rear belt and to free the bottle to allow the bottle to continue on its path by being driven by the rear belt.

2. The method according to claim 1, the method including the step consisting in moving a downstream pusher member into a deployed position and an upstream pusher member into a retracted position, moving a bottle among the set of bottles coming from the loading zone until the bottle is pressed against the downstream pusher member, stopping the movement of the rear belt, moving the upstream pusher member into the deployed position, then moving the downstream pusher member to the retracted position and restarting movement of the rear belt so as to position the bottle in front of the storage module that has to integrate the bottle.

3. The method according to claim 1, including the storage of a table of correspondences between identifiers of the bottles among the set of bottles present in the at least one storage module and locations receiving bottles defined by the at least one storage module, and updating the table on each movement of bottles within the at least one storage module.

4. The method according to claim 1, the bottle conveyor and storage system including a conveyor configured to transport the new bottle from the loading zone to the at least one storage module in which the new bottle must be stored and the bottle among the set of bottles stored in the storage zone from the at least one storage module in which the bottle was stored to the unloading zone.

5. The method according to claim 1, the automatic device including a spacing control mechanism for controlling a space between the bottles among the set of bottles on the rear belt.

6. The method according to claim 5, the spacing control mechanism including an upstream pusher member and a downstream pusher member mobile between retracted positions enabling the passage of bottles among the set of bottles driven by the rear belt and deployed positions blocking the passage of the bottles, a distance between the upstream pusher member and the downstream pusher member being chosen to trap no more than a single bottle among the set of bottles between the upstream pusher member and the downstream pusher member when the upstream pusher member and the downstream pusher member are in the deployed position.

7. The method according to claim 6, the distance between the upstream pusher member and the downstream pusher member further being chosen such that when the single bottle abuts against the downstream pusher member, the upstream pusher member can be deployed without being blocked by the single bottle and can move away an immediately adjacent bottle on the rear belt such that the single bottle trapped between the upstream and downstream pusher members is separated from the immediately adjacent bottle by a predefined distance, corresponding to a diameter of the upstream pusher member.

8. The method according to claim 1, the module belt being tensioned between a front wheel and a rear wheel and the module belt having between the front wheel and the rear wheel two rectilinear portions, the at least one storage module including a casing having a curved portion guiding the set of bottles of the storage zone present between the separators in their movement around the rear wheel.

9. The method according to claim 1, each separator having two opposite faces that are concave on the outside, matching the curvature of a bottle among the set of bottles.

10. The method according to claim 1, the automatic device including a plurality of juxtaposed identical storage modules.

11. The method according to claim 1, the at least one storage module being removably mounted in the automatic device.

12. The method according to claim 11, the at least one storage module being received in a housing including a locking lever on which an operator can act to release the at least one storage module for the removal of the at least one storage module from the automatic device.

13. The method according to claim 1, the at least one storage module including a plurality of pulleys each carrying at least one permanent magnet, the pulleys being disposed so that each generates as each pulley rotates a rotating magnetic field for driving a stirring rod present in a bottle among the set of bottles at a corresponding location on the at least one storage module, the pulleys being driven by a same belt circulating between the pulleys.

14. The method according to claim 4, the conveyor including a front belt, the front belt providing at least a part of the transport to the unloading zone.

15. The method according to claim 14, the front belt and the rear belt extending substantially parallel to one another, mounted on drive pulleys rotating about shafts and being moved in opposite directions by a same motor, a transmission enabling coupling of the movements of the drive pulleys.

16. The method according to claim 14, the conveyor including a deflector that expels a bottle among the set of bottles driven against the deflector by the rear belt toward the front belt.

17. The method according to claim 14, the path of a bottle among the set of bottles driven around a front wheel of the at least one storage module passing over the rear belt.

18. The method according to claim 14, the front belt and the rear belt being parallel to one another.

19. The method according to claim 1, the automatic device comprising an adapter, at least one bottle among the set of bottles being of a smaller size and received in the adapter having an outside diameter corresponding to that of bottles of a largest size that can be used.

20. The method according to claim 19, the adapter having an inclined and off-center housing such that an opening of the at least one bottle among the set of bottles being of a smaller size remains centered.

* * * * *